D. & D. F. LUSE.
Seed-Planter.
No. 53,459. Patented Mar. 27, 1866.
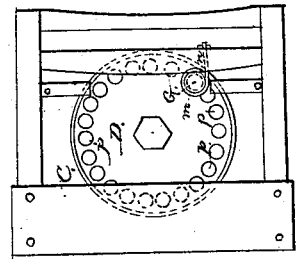
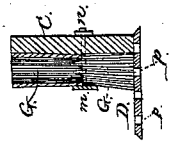
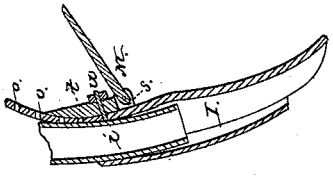
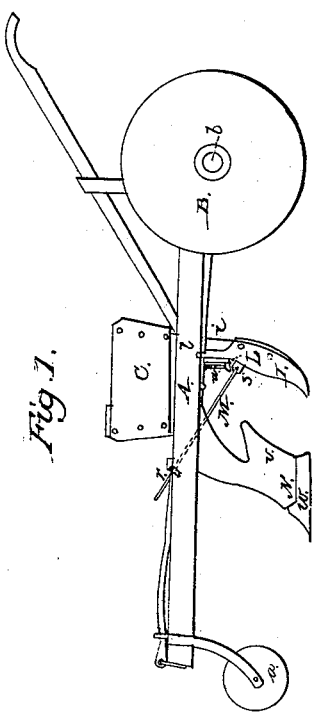
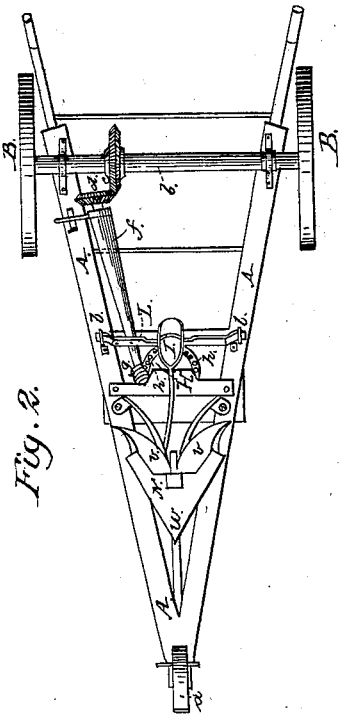
Witnesses:
Inventors:

UNITED STATES PATENT OFFICE.

D. LUSE AND D. F. LUSE, OF SPRING MILLS, PENNSYLVANIA.

IMPROVEMENT IN CORN-PLANTERS.

Specification forming part of Letters Patent No. 53,459, dated March 27, 1866.

*To all whom it may concern:*

Be it known that we, D. LUSE and D. F. LUSE, of Spring Mills, in the county of Centre and State of Pennsylvania, have invented a new and Improved Corn-Planter; and we do hereby declare that the following is a full and exact description thereof, reference being had to the accompanying drawings, making part of this specification—

Figure 1 being a side elevation of our improved corn-planter; Fig. 2, a bottom view thereof; Fig. 3, a plan of the seed-box and dropping apparatus therein; Fig. 4, a central vertical section of the seed-dropping drill-tooth and its immediate appendages; Fig. 5, a central vertical section of the seed-brush and its fastenings.

Like letters designate corresponding parts in all of the figures.

We ordinarily employ a common triangular frame, A, supported by two wheels, B B, near the rear end, and gaged in height by a caster-wheel, $a$, in front.

The seed-box C is situated as usual, and there is the usual seed-dropping drill-tooth I underneath the rear part of the seed-box, but having some peculiarities of arrangement. There is also a furrow-preparing plow, N, in front of the seed-dropping drill-tooth, having a peculiar construction and operation in its connection with other parts of the planter, hereinafter to be specified.

On the shaft $b$ of the supporting-wheels B B, with which the shaft turns, is a bevel-gear wheel, $c$, which gears into another similar wheel, $d$, on a shaft, $f$, that extends forward under the seed-box, and is caused to revolve slowly as the planter moves forward.

A screw-thread, $g$, Fig. 2, engages with a circular row of pins, $h$, on a disk, H, and causes the said disk to move round the distance of one pin at each revolution of the shaft $f$. The disk H is situated beneath the dropping-wheel D, Fig. 3, in the hopper, is concentric with it, and is so coupled to it as to turn it as the machine moves forward, but may be so arranged as to be uncoupled from it as the machine moves backward. The dropping holes or cavities $p\ p$, Fig. 3, are situated at such distance apart as to drop the corn at any distance required.

The brush G, Fig. 3, which sweeps back the surplus corn from the dropping-holes, is arranged and secured in place peculiarly. It is confined in a tube or made close at top, and it is held in place by a curved hook, $m$, embracing it, and having a screw-shank reaching back through the side of the seed-box and drawn tight by a nut, $n$, so as to tighten the brush as desired and adjust it at pleasure.

The drill-tooth I is fastened to a swinging bail, L, of crank form, whose bearings $l\ l$ are above on the under side of the frame. A flange, $t$, Fig. 4, projecting upward from the bail at the center and provided with a bolt hole or holes, serves to attach the drill-tooth to the bail. There is a set of bolt-holes, $o\ o$, in the upper part of the drill-tooth, by which the depth of the drill-tooth's running may be adjusted to any desired extent, while the swinging of the bail enables the drill-tooth to be adjusted also to any angle desired. In order to adjust this angle, a rod, M, is hinged to the drill-tooth at $s$, and extends thence forward and upward through the frame of the machine and terminates in a screw-thread, so that a nut, $r$, thereon adjusts the length of the rod as desired. The joint at $s$ may have a wooden pin, which will break when any obstruction strikes the drill-tooth, thereby causing the same to give way without injury to the machine.

The plow or furrow-clearer N in front of the drill-tooth has a regular double share, $w$, and two regular or complete mold-boards or wings, $v\ v$, whereby not only are turfs and other undesirable obstructions pushed aside from the furrow, but are turned away, like a furrow-slice, thus invariably insuring the complete removal of the obstructions from the rows and leaving the ground fine and clear at and near the furrow.

We are aware that furrow openers and clearers of various forms have been used before; but, so far as we are advised, no previous arrangement of a double share and a double mold-board plow or furrow-clearer completely turning furrows both ways has been used in this connection.

What we claim as our invention, and desire to secure by Letters Patent, is—

1. The bail L, provided with the attaching and adjusting flange $t$ and angle-adjusting rod M, for mounting the drill-tooth upon, substantially as and for the purposes herein specified.

2. The double share and full double moldboard furrow-clearing plow N, in combination with the drill-tooth I, substantially as and for the purposes herein set forth.

The above specification of our improved corn-planter signed by us this 5th day of June, 1865.

D. LUSE.
D. F. LUSE.

Witnesses:
JOHN M. MILLER,
JOHN MINNICH.